(12) United States Patent
Johnston (10) Patent No.: US 8,467,308 B2
(45) Date of Patent: Jun. 18, 2013

(54) COMMUNICATION SESSION QUALITY INDICATOR

(75) Inventor: Alan B. Johnston, St. Louis, MO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 612 days.

(21) Appl. No.: 12/542,473

(22) Filed: Aug. 17, 2009

(65) Prior Publication Data

US 2010/0040050 A1 Feb. 18, 2010

Related U.S. Application Data (63) Continuation of application No. 09/983,689, filed on Oct. 25, 2001, now abandoned.

(51) Int. Cl.
*H04L 12/26* (2006.01)

(52) U.S. Cl.
USPC .......................................... 370/252; 370/401

(58) Field of Classification Search
None
See application file for complete search history.

(56) References Cited

U.S. PATENT DOCUMENTS

| | | | |
|---|---|---|---|
| 5,634,012 A | 5/1997 | Stefik et al. | |
| 5,680,116 A | 10/1997 | Hashimoto et al. | |
| 5,793,976 A * | 8/1998 | Chen et al. ................... | 370/252 |
| 5,867,571 A | 2/1999 | Borchering | |
| 5,883,894 A | 3/1999 | Patel et al. | |
| 5,889,777 A | 3/1999 | Miyao et al. | |
| 5,903,559 A | 5/1999 | Acharya et al. | |
| 5,909,430 A | 6/1999 | Reaves | |
| 5,928,331 A | 7/1999 | Bushmitch | |
| 5,930,348 A | 7/1999 | Regnier et al. | |
| 5,933,412 A | 8/1999 | Choudhury | |
| 5,953,338 A | 9/1999 | Ma et al. | |
| 5,960,004 A | 9/1999 | Ramstrom et al. | |
| 5,960,416 A | 9/1999 | Block | |
| 5,991,292 A | 11/1999 | Focsaneanu et al. | |
| 6,058,113 A | 5/2000 | Chang | |
| 6,073,160 A | 6/2000 | Grantham et al. | |
| 6,088,358 A | 7/2000 | Tomita et al. | |
| 6,097,722 A | 8/2000 | Graham et al. | |
| 6,118,759 A * | 9/2000 | Ohyoshi et al. ............... | 370/229 |
| 6,137,777 A | 10/2000 | Vaid et al. | |
| 6,141,686 A | 10/2000 | Jackowski et al. | |
| 6,151,319 A | 11/2000 | Dommety et al. | |
| 6,157,648 A | 12/2000 | Voit et al. | |
| 6,205,148 B1 | 3/2001 | Takahashi et al. | |
| 6,259,677 B1 | 7/2001 | Jain | |
| 6,275,471 B1 | 8/2001 | Bushmitch et al. | |
| 6,498,791 B2 | 12/2002 | Pickett et al. | |

(Continued)

OTHER PUBLICATIONS

"IP Highway Product Overview," Sep. 22, 1999, pp. 1-4.

(Continued)

*Primary Examiner* — Gregory Sefcheck
*Assistant Examiner* — Joshua Smith (57) ABSTRACT

An approach for providing a quality indicator in support of a communication session between a near end station and a far end station over a data network. The quality of the communication session in a direction of the near end station sending to the far end station is determined. A message containing statistics associated with the communication session is transmitted according to a prescribed protocol to the near end station to notify the near end station of the quality of the communication session. The prescribed protocol supports real-time data exchange. The present invention has particular applicability to SIP (Session Initiation Protocol) IP (Internet Protocol) telephony services.

16 Claims, 7 Drawing Sheets

U.S. PATENT DOCUMENTS

| | | | |
|---|---|---|---|
| 6,526,445 B1 | 2/2003 | Kumar et al. | |
| 6,553,515 B1 | 4/2003 | Gross et al. | |
| 6,567,929 B1* | 5/2003 | Bhagavath et al. | 370/432 |
| 6,839,341 B1 | 1/2005 | Nakajima | |
| 6,882,637 B1* | 4/2005 | Le et al. | 370/349 |
| 6,954,615 B2* | 10/2005 | Sano | 455/41.1 |
| 6,967,958 B2 | 11/2005 | Ono et al. | |
| 6,993,013 B1* | 1/2006 | Boyd | 370/352 |
| 7,142,506 B1 | 11/2006 | Pogrebinsky | |
| 7,236,494 B2* | 6/2007 | Mallory | 370/394 |
| 2001/0005372 A1 | 6/2001 | Cave et al. | |
| 2001/0021186 A1 | 9/2001 | Ono et al. | |
| 2001/0022785 A1 | 9/2001 | Pessi | |
| 2002/0004841 A1 | 1/2002 | Sawatari | |
| 2002/0075876 A1* | 6/2002 | Yoshikawa et al. | 370/395.42 |
| 2002/0114274 A1 | 8/2002 | Sturges et al. | |
| 2002/0141392 A1 | 10/2002 | Tezuka et al. | |
| 2002/0163908 A1 | 11/2002 | Lakaniemi et al. | |
| 2003/0007458 A1 | 1/2003 | Procopio | |
| 2003/0016627 A1 | 1/2003 | MeLampy et al. | |
| 2003/0037158 A1 | 2/2003 | Yano et al. | |
| 2003/0061344 A1 | 3/2003 | Monroe | |

OTHER PUBLICATIONS

Barzilai, et al., "Design and Implementation of an RSVP-based Quality of Service Architecture for Integrated Services Internet," IEEE, May 1997, pp. 543-551.

Bernet, et al., "A Framework for Differentiated Services—Draft," <draft-ietf-diffserv-framework-02.txt>, Internet Draft, The Internet Society, Copyright 1999, 35 pages.

Boyle, et al., "COPS usuage for RSVP (Draft)," draft-ietf-rap-cops-rsvp-05.txt, Internet Draft, Internet Engineering Task Force (IETF), Jun. 14, 1999, pp.1-15.

Boyle, et al., The COPS (Common Open Policy Service) Protocol (Draft), Internet Draft, Internet Engineering Task Force (IETF), Aug. 16, 1999, pp. 1-33.

Braden, et al., "Resource ReSerVation Protocol (RSVP)—Version 1 Functional Specification," Request for Comments: 2205, Category; Standards Track, Sep. 1997, 99 pages.

Braun, et al., "Internet Protocols for Multimedia Communications," Part. II: Resource Reservation, Transport, and Application Protocols, IBM European Networking Center, IEEE Multimedia, Copyright 1997, pp. 74-82.

Eriksson, et al., "SIP Telephony Gateway on DTM," The Royal Institute of Technology Sweden, Bachelor's thesis, Jul. 2, 1999, pp. 1-54.

Roberts, "The New Class System. Comprehensive approaches give net managers the power to prioritize—all the way across the network," Oct. 1997, 14 pages.

Rosenberg, et al., "Internet Telephony Gateway Location", In Proceedings of the Conference on Computer Communications (IEEE Infocom), 1998, pp. 488-496.

Schulzrinne, et al., "A comprehensive multimedia control architecture for the Internet," IEEE, Sep. 1997, pp. 65-76.

Schulzrinne, et al., "Interaction of Call Setup and Resource Reservation Protocols in Internet Telephony," Jun. 11, 1999, pp. 1-13.

Schulzrinne, et al., "RFC 1889 - RTP: A Transport Protocol for Real-Time Applications," The Internet Society, Jan. 1996, pp. 1-75.

Sinnreich, et al., "AAA Usage for IP Telephony with QoS (Internet Draft)," Internet Engineering Task Force (IETF), Jan. 2001, 20 pages.

Sinnreich, et al., "Interdomain IP Communications with QoS, Authorization and Usage Reporting (Internet Draft)," Internet Engineering Task Force (IETF), Feb. 2000, 51 pages.

Sinnreich, et al., "Interdomain IP Communications with QoS, Authorization and Usage Reporting (Internet Draft)," Internet Engineering Task Force (IETF), Jul. 2000, 18 pages.

Wedlund, et al, "Mobility Support Using SIP," Association for Computing Machinery, 1999, 7 pages.

White, "RSVP and Integrated Services in the Internet: A Tutorial," University College London, IEEE Communications Magazine, May 1997, pp. 100-106.

Wroclawski, "The Use of RSVP with IETF Integrated Services, Request for Comments: 2210," Network Working Group, MIT LCS, Sep. 1999, 29 pages.

Yavatkar, et al., "A Framework for Policy-based Admission Control (Internet Draft)," Internet Engineering Task Force (IETF), Apr. 1999, pp. 1-19.

* cited by examiner

COMMUNICATION SESSION QUALITY INDICATOR

CROSS-REFERENCE TO RELATED APPLICATIONS

The present application is a continuation of U.S. patent application Ser. No. 09/983,689 filed on Oct. 25, 2001, the contents of which is hereby incorporated by reference.

FIELD OF THE INVENTION

The present invention relates to a communications system, and is more particularly related to call processing over a data network.

BACKGROUND OF THE INVENTION

The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as Voice-over-IP (VOIP), is the conversion of voice information into data packets that are transmitted over an IP network. Users also have turned to IP telephony as a matter of convenience in that both voice and data services are accessible through a single piece of equipment, namely a personal computer. The continual integration of voice and data services further fuels this demand for IP telephony applications.

In the traditional circuit switched PSTN (public switched telephone network) environment, the forward and reverse voice paths of a telephone call between a near end station and a far end station always traverse the same set of switches and network elements. As a result, any degradation or interference in one call direction is often mirrored in the reverse direction with respect to the near end station and the far end station. For example, if a near end station hears static during the call, it is highly likely that the other party is experiencing the same problem. Accordingly, each party to the call is implicitly notified that the quality of the call is poor; as a result, the near end station may take appropriate action, such as hanging up and re-establishing the call, instead of continuing with the conservation (despite the fact that the other party may not be able to hear any of the discussion). It is recognized that such a feedback mechanism is currently lacking with respect to voice calls over the Internet.

With VOIP technology, the voice or media path between a near end station and a far end station in the forward and reverse directions are likely to be different, traversing different network elements and physical circuits with each transmission. As a result, it is entirely possible that a near end station's media packets arrive without any problems, while the far end station's media packets (in the opposite direction) may be lost or delayed. Therefore, a feedback mechanism analogous to that of the traditional telephone call over the PSTN cannot be effected. Without such notification, the near end station cannot take corrective action, such as requesting a guaranteed quality of service (QoS) on the call, or attempt to call at a later time.

Therefore, there is a need for an approach for providing notification to convey quality of a communication session.

SUMMARY OF THE INVENTION

These and other needs are addressed by the present invention in which a feedback mechanism, which may be visual or audio, is introduced to notify a near end station of the quality of a voice communication session over a data network (e.g., an IP-based (Internet Protocol) network). The feedback mechanism is based upon the quality statistics that are convey via a real-time communications protocol, such as Real-time Transport Control Protocol (RTCP).

In one aspect of the present invention, a method is provided for supporting a communication session between a near end station and a far end station over a data network. The method includes determining quality of the communication session in a direction of the near end station to the far end station. The method also includes transmitting a message according to a prescribed protocol to the near end station to notify the near end station of the quality of the communication session, wherein the prescribed protocol supports real-time data exchange.

Another aspect of the present invention, a network device is provided for supporting a communication session between a near end station and a far end station over a data network. The device includes a processor that is configured to determine quality of the communication session in a direction of the near end station to the far end station. The device also includes a communications interface that is coupled to the processor and is configured to transmit a message according to a prescribed protocol to the near end station to notify the near end station of the quality of the communication session, wherein the prescribed protocol supports real-time data exchange.

Another aspect of the present invention, a system for providing telephony services over a data network is disclosed. The system includes a first station that has connectivity with the data network and is configured to initiate establishment of a communication session over the data network. The system includes a second station that is configured to acknowledge the communication session with the first station, wherein the second station is further configured to determine quality of the communication session in a direction from the second station to the first station, and to transmit a message according to a prescribed protocol to the first station to notify the first station of the quality of the communication session, the prescribed protocol supporting real-time data exchange.

Another aspect of the present invention, a device for supporting a communication session between a near end station and a far end station over a data network is disclosed. The device includes means for determining quality of the communication session in a direction of the near end station to the far end station; and means for transmitting a message according to a prescribed protocol to the near end station to notify the near end station of the quality of the communication session. The prescribed protocol supports real-time data exchange.

In yet another aspect of the present invention, a computer-readable medium carrying one or more sequences of one or more instructions for supporting a communication session between a near end station and a far end station over a data network is disclosed. The one or more sequences of one or more instructions include instructions which, when executed by one or more processors, cause the one or more processors to perform the step of determining quality of the communication session in a direction of the near end station to the far end station. Another step includes transmitting a message according to a prescribed protocol to the near end station to notify the near end station of the quality of the communication session. The prescribed protocol supports real-time data exchange.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is discussed with respect to the Session Initiation Protocol (SIP), it should be appreciated that one of ordinary skill in the art would recognize that the present invention has applicability to other equivalent communication protocols.

Figure 1:
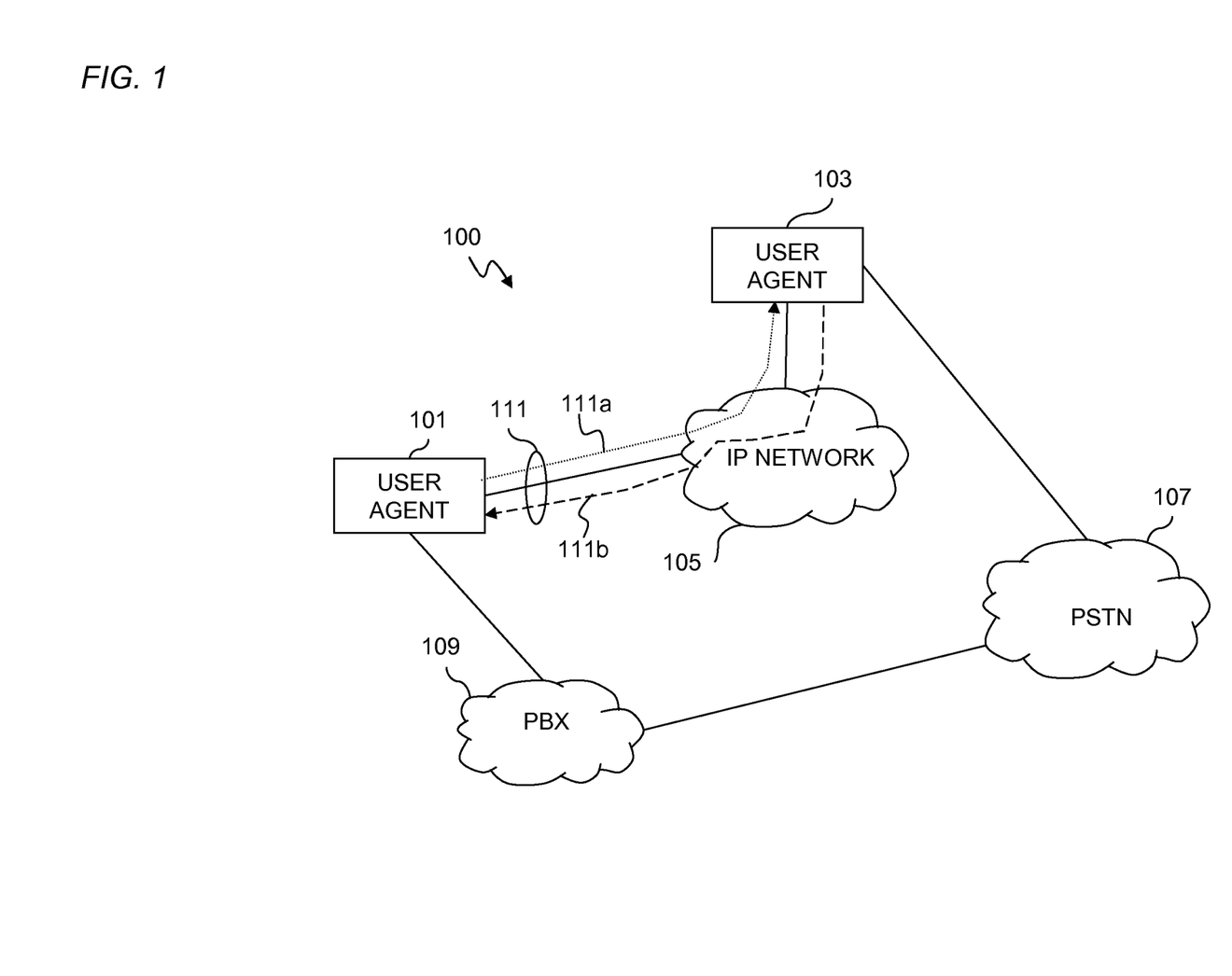
FIG. 1 is a diagram of a communications system that is capable of providing a quality indicator of a voice communication session established over a data network, according to an embodiment of the present invention.

FIG. 1 shows a diagram of a communications system that is capable of providing a quality indicator of a voice communication session established over a data network, according to an embodiment of the present invention. In particular, the communication system 100 supports IP telephony services among multiple user agents 101, 103, according to the Session Initiation Protocol (SIP).

SIP has emerged to address the signaling of calls over an IP network 105. As an end-to-end protocol, SIP advantageously permits the end nodes with the capability to control call processing. By contrast, traditional telephony services are totally controlled by the intermediate network components; that is, the switches have full control over call establishment, switching, and call termination. In the SIP architecture, it is sometimes desirable for an intermediate network element to control the call processing. For example, codec (coder/decoder) incompatibility may require network intervention to ensure that the exchange of packets are meaningful.

As shown, the user agent 103 is connected to the Public Switched Telephone Network (PSTN) 111. In this example, the user agent 101 has connectivity to a Private Branch Exchange (PBX), which in turn, passes calls through to the PSTN 107. Because the PSTN 107 has connectivity to the IP network 105, communication among voice stations (not shown) that are serviced through the PSTN 107, and personal computers that are attached to the IP network 105 can be established (e.g., Voice over IP (VOIP)).

Attention is now drawn to transmission of voice calls over the IP network 105. Four possible scenarios exist with the placement of a VOIP call: (1) phone-to-phone, (2) phone-to-PC, (3) PC-to-phone, and (4) PC-to-PC. In the first scenario of phone-to-phone call establishment, a voice station is switched through PSTN 107 by a switch to a VOIP gateway (not shown), which forwards the call through the IP network 105. The packetized voice call is then routed through the IP network 105, exiting the IP network 105 at an appropriate point to enter the PSTN 107 and terminates at a voice station. Under the second scenario, a voice station places a call to PC through a switch to the PSTN 107. This voice call is then switched by the PSTN 107 to a VOIP gateway (not shown), which forwards the voice call to a PC via the IP network 105. The third scenario involves a PC that places a call to a voice station. Using a voice encoder, the PC introduces a stream of voice packets into the IP network 105 that are destined for a VOIP gateway (not shown). A VOIP gateway (not shown) converts the packetized voice information into a POTS (Plain Old Telephone Service) electrical signal, which is circuit switched to the voice station. Lastly, in the fourth scenario, a PC establishes a voice call with a PC; in this case, packetized voice data is transmitted from the PC via the IP network 105 to another PC, where the packetized voice data is decoded.

The system 100 employs SIP to exchange messages. A detailed discussion of SIP and its call control services are described in IETF RFC 2543 and IETF Internet draft "SIP Call Control Services", Jun. 17, 1999; both of these documents are incorporated herein by reference in their entireties. SIP messages are either requests or responses. The user agents 101, 103 may behave as either a user agent client (UAC) or a user agent server (UAS), depending on the services that the system 100 is executing. In general, a user agent client issues requests, while a user agent server provides responses to these requests.

SIP defines six types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request.

Another method is the BYE request, which indicates to the UAS that the call should be released. In other words, BYE terminates a connection between two users or parties in a conference. The next method is the OPTIONS method; this method solicits information about capabilities and does not assist with establishment of a call. Lastly, the REGISTER provides information about a user's location to a SIP server.

As seen in FIG. 1, the user agents 101, 103 communicate over a communications channel 111 that is established, for example, using SIP. Because SIP can be used for signaling, a media session transported using schemes such as RTP (Real-Time Transport Protocol)/UDP (User Datagram Protocol), RTP/TCP (Transmission Control Protocol), RTP/SCTP (Stream Control Transmission Protocol), and AAL (ATM Adaptation Layer)/ATM (Asynchronous Transfer Mode) among many others; this service allows calling between schemes in an efficient way.

RTP operates with a companion protocol, RTCP, to provide visual feedback to the near end station on the quality of his transmitted media (the quality of his received media is readily available just by listening to the sound). As used herein, the terms "near end station" and "far end station" refer to the relative relationship between two stations (e.g., agents, entities, parties, etc.) in communication, without regard to the station that initiates the communication session. RTCP packet exchange allows the other end of the conversation to report back the quality. Because VOIP systems employ either SIP or H.323, which both support RTP, RTCP can be readily used. To appreciate the present invention, a brief description of the SIP protocol architecture is now described with respect to FIG. 2.

Figure 2:
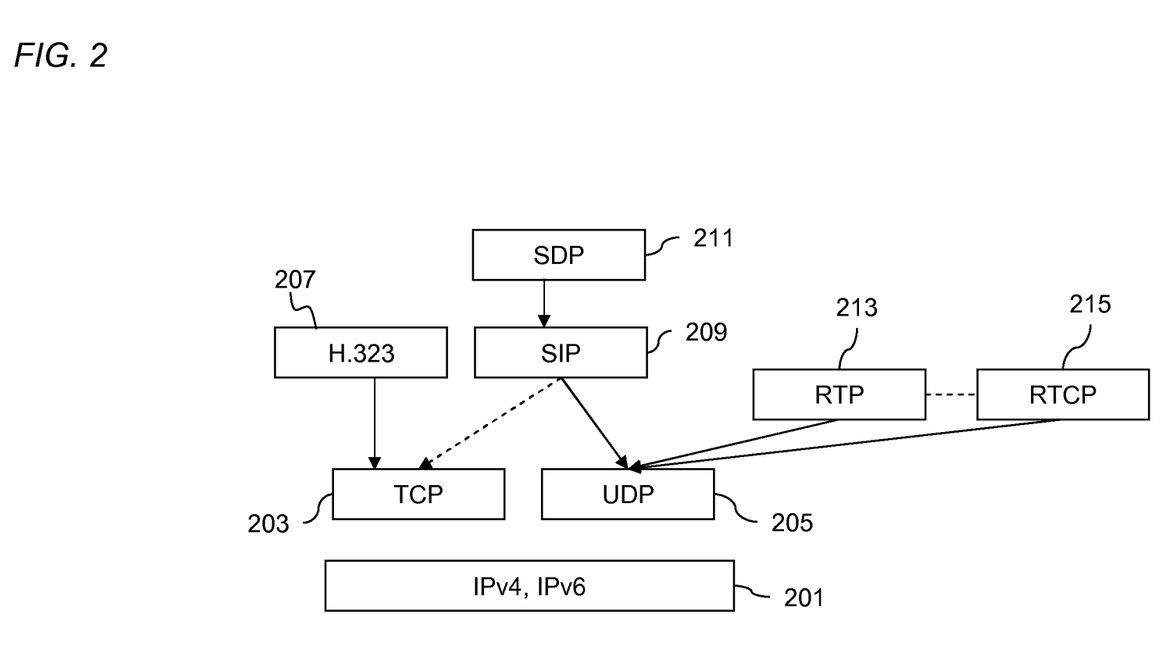
FIG. 2 is a diagram of an exemplary protocol architecture employed in the system of FIG. 1.

FIG. 2 is a diagram of an exemplary protocol architecture employed in the system of FIG. 1. The layered nature of the architecture provides protocol separation and independence, whereby one protocol can be exchanged or modified without affecting the other higher layer or lower layer protocols. It is advantageous that the development of these protocols can occur concurrently and independently.

The foundation of the architecture rests with the IP layer 201. The IP layer 201 provides an unreliable, connectionless data delivery service at the network level. The service is "unreliable" in the sense that the delivery is on a "best effort" basis; that is, no guarantees of packet delivery are made. IP is the de facto Internet working protocol standard. Current standards provide two versions of IP: Version 4 and Version 6. One of the key differences between the versions concerns addressing; under Version 4, the address fields are 32 bits in length, whereas in Version 6, the address field has been extended to 128 bits.

Above the IP layer 201 are the TCP (Transmission Control Protocol) 203 and the UDP (User Datagram Protocol) 205. The TCP layer 203 provides a connection-oriented protocol that ensures reliable delivery of the IP packets, in part, by performing sequencing functions. This sequencing function reorders any IP packets that arrive out of sequence. In contrast, the User Datagram Protocol (UDP) 205 provides a connectionless service that utilizes the IP protocol 201 to send a data unit, known as a datagram. Unlike TCP 203, UDP 205 does not provide sequencing of packets, relying on the higher layer protocols to sort the information. UDP 205 is preferable over TCP 203 when the data units are small, which saves processing time because of the minimal reassembly time. One of ordinary skill in the art would recognize that embodiments of the present invention can be practiced using either TCP 203 or UDP 205, as well as other equivalent protocols.

The next layer in the IP telephony architecture of FIG. 2 supplies the necessary IP telephony signaling and includes the H.323 protocol 207 and the Session Initiation Protocol (SIP) 209. The H.323 protocol 207, which is promulgated by the International Telecommunication Union (ITU), specifies a suite of protocols for multimedia communication. SIP 209 is a competing standard that has been developed by the Internet Engineering Task Force (IETF). SIP 209 is a signaling protocol that is based on a client-server model. It should be noted that both the H.323 protocol 207 and SIP 209 are not limited to IP telephony applications, but have applicability to multimedia services in general. In the preferred embodiment of the present invention, SIP 209 is used to create and terminate voice calls over an IP network 105. However, it is understood that one of ordinary skill in the art would realize that the H.323 protocol 207 and similar protocols can be utilized in lieu of SIP 209. Above SIP 209 is the Session Description Protocol (SDP) 211, which provides information about media streams in the multimedia sessions, as to permit the recipients of the session description to participate in the session.

As seen in FIG. 2, SIP 209 can utilize either TCP 203 or UDP 205. However, UDP 205 is adopted in the preferred embodiment of the present invention. Similar to other IETF protocols (e.g., the simple mail transfer protocol (SMTP) and Hypertext Transfer Protocol (HTTP)), SIP 209 is a textual protocol. As indicated earlier, SIP 209 is a client-server protocol, and as such, clients generate requests that are responded to by the servers.

Further, RTP 213 and the auxiliary protocol, RTCP 215, reside above the TCP 203 and UDP 205 layers. For example, UDP 205 utilizes the multiplexing function of RTP 213. RTP and RTCP packets are usually transmitted using UDP/IP service. RTP 213 and RTCP 215 are more fully described in FIGS. 3 and 4.

Figure 3:
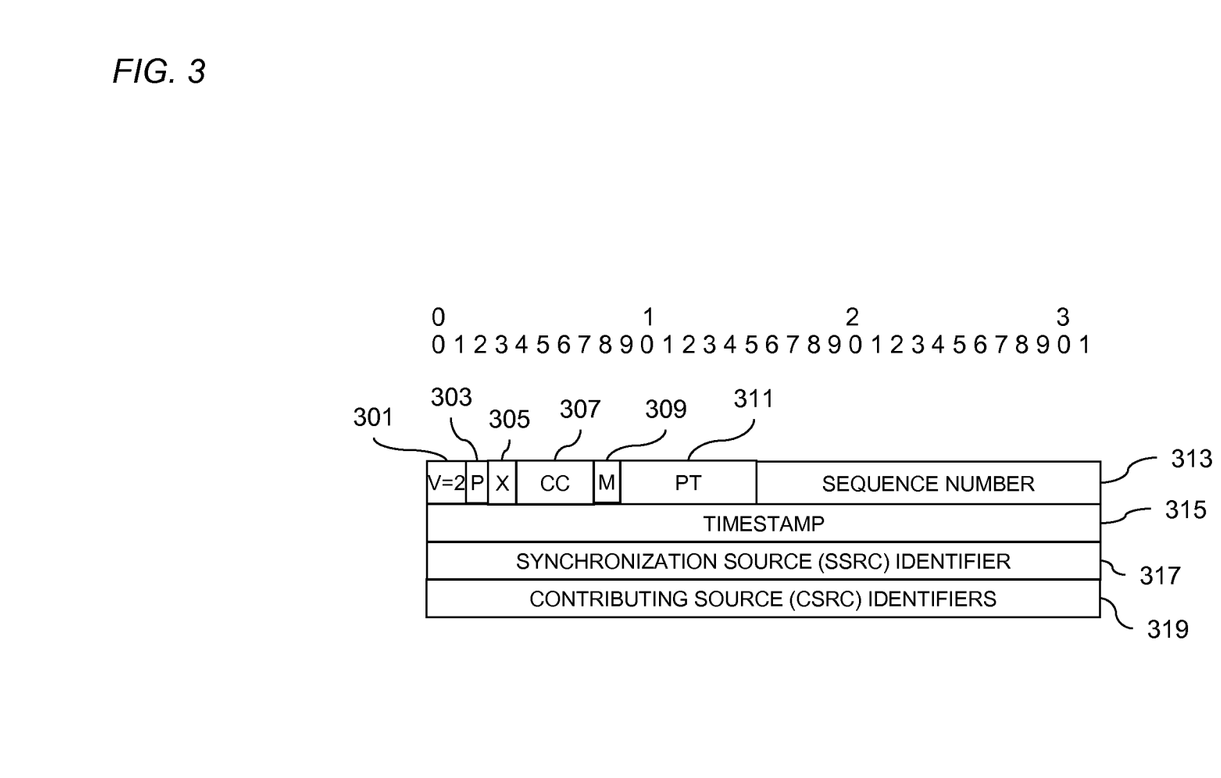
FIG. 3 is a diagram of a header format of the Real-Time Transport Protocol that is utilized in the system of FIG. 1.

FIG. 3 shows a diagram of a header format of the Real-Time Transport Protocol that is utilized in the system of FIG. 1. As indicated above, the Real-Time Transport Protocol (RTP) is an IP-based protocol, which supports real-time data transmissions (e.g., video and audio streams). RTP provides such services as time reconstruction, loss detection, security, and content identification, which are well-suited to support Internet telephony. RTP is detailed in IETF RFC 1889, entitled "RTP: A Transport Protocol for Real-Time Applications", and RFC 1890, entitled "RTP Profile for Audio and Video Conferences with Minimal Control"; both of which are incorporated herein by reference their entireties.

RTP is usually implemented within the application. To set up an RTP session, the application defines a particular pair of destination transport addresses (one network address plus a pair of ports for RTP and RTCP). In a multimedia session, each medium is carried in a separate RTP session, with its own RTCP packets reporting the reception quality for that session. For example, audio and video would travel on separate RTP sessions, enabling a receiver to select whether or not to receive a particular medium.

An audio-conferencing scenario presented in RFC 1889 illustrates the use of RTP. Suppose each participant sends audio data in segments of 20 ms duration. Each segment of audio data is preceded by an RTP header, and then the resulting RTP message is placed in a UDP packet. The RTP header indicates the type of audio encoding that is used, e.g., PCM (Pulse Code Modulation). Users can opt to change the encoding during a conference in reaction to network congestion or, for example, to accommodate low-bandwidth requirements of a new conference participant. Timing information and a sequence number in the RTP header are used by the receivers to reconstruct the timing produced by the source, so that in this example, audio segments are contiguously played out at the receiver every 20 ms.

As seen in FIG. 3, the header of an RTP packet is 16 octets in length, in which the first 12 octets are present in every RTP packet. A version field (V) 301 identifies the version of RTP. A 1-bit padding (P) field 303 is set, if the packet contains one or more additional padding octets at the end which are not part of the payload. An extension (X) field 305, which is 1 bit, is set to indicate that the header is followed by exactly one header extension. A Contributing Source (CSRC) count (CC) field 307 specifies the number of CSRC identifiers that follow the fixed header; CSRCs are more fully described below. A 1-bit marker (M) field 309 permits significant events, such as frame boundaries, to be marked in the packet stream. A payload type (PT) field 311 is 7 bits in length and identifies the format of the RTP payload.

RTP supports end-to-end transport of real-time data via a number of mechanisms, which include timestamping and sequence numbering. A 16-bit sequence number field 313 tracks the number of RTP packets that are sent. This sequence number field 313 may be used by the receiver to detect packet loss and to restore packet sequence.

A timestamp field 315 captures the sampling instant of the first octet in the RTP data packet; the timestamp information permits synchronization and jitter calculations. The sender sets the timestamp according to the instant the first octet in the packet was sampled. After receiving the data packets, the receiver uses the timestamp to reconstruct the original timing. As mentioned, the timestamp is also used to synchronize different types of data streams (e.g., audio and video data).

Further, a RTP includes a synchronization source (SSRC) identifier field 317, which provides unique identification of synchronization sources within an identical RTP session. The SSRC field 317 informs a receiving application the origin of the data. A contributing source (CSRC) identifier field 319 accommodates 0 to 15 items and identifies the contributing sources for the payload contained in the packet; the CC field 307 (described above) indicates the number of identifiers in the CSRC field 319. The CSRC identifiers are inserted by mixers, using the SSRC identifiers of contributing sources.

Figure 4:
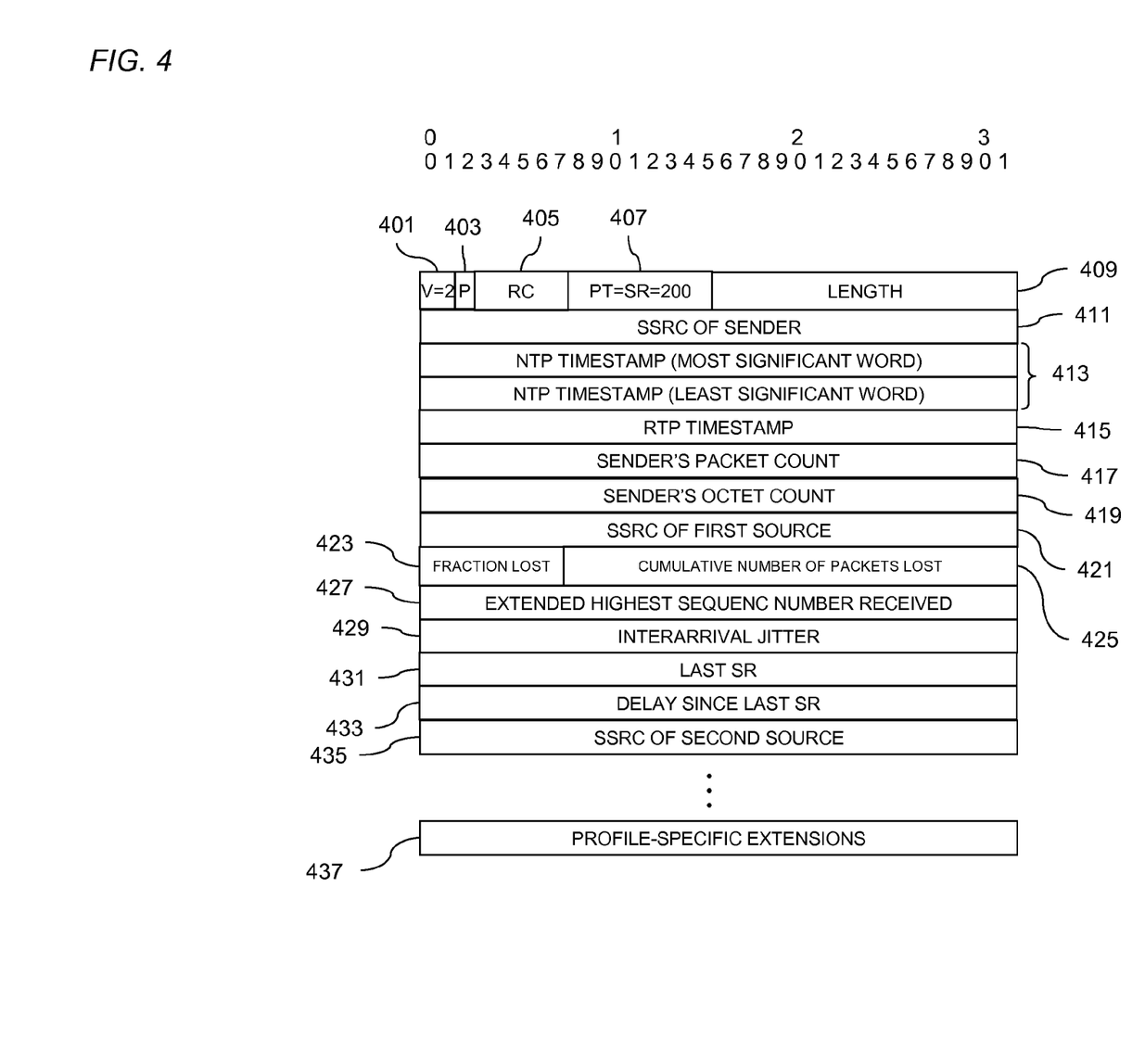
FIG. 4 is a diagram of a format of the sender report Real-Time Transport Control Protocol that is employed in the system of FIG. 1.

FIG. 4 shows a diagram of a format of the sender report Real-Time Transport Control Protocol that is employed in the system of FIG. 1. RTCP is a control protocol designed to operate in conjunction with RTP, and is detailed in IETF RFCs 1889 and 1890. In an RTP session, the sender and receiver periodically transmit RTCP packets to convey feedback on the quality of the data delivery. RFC 1889 defines five RTCP packet types to carry control information: receiver report (RR), sender report (SR), source description (SDES) items, indicates end of participation (BYE), and application specific functions (APP). Participants that are not active senders generate the receiver reports. The RR packets contain reception quality feedback about data delivery, including the highest packets number received, the number of packets lost, inter-arrival jitter, and timestamps to calculate the round-trip delay between the sender and the receiver. The sender reports are generated by active senders; these reports provide quality feedback as in RR, along with information about the sender (e.g., information on inter-media synchronization, cumulative packet counters, and number of bytes sent). The source description items contain information about the sources; e.g., canonical names (CNAME), user's name, telephone number, e-mail address and other information.

RTCP carries a persistent transport-level identifier for an RTP source called the canonical name or CNAME. Since the SSRC identifier may change if a conflict is discovered or a program is restarted, receivers require the CNAME to keep track of each participant. Receivers also require the CNAME to associate multiple data streams from a given participant in a set of related RTP sessions, for example to synchronize audio and video. The BYE packet signals the termination of a RTP session.

The above RTCP packets support a number of services. One service is monitoring of the Quality of Service (QoS) and congestion control. Notably, RTCP provides feedback to an application about the quality of data distribution. As mentioned above, RTP receivers provide reception quality feedback using RTCP report packets: the sender report (SR) and receiver report (RR). The SR is transmitted by a participant if the participant has sent at least one data packet since the last report; otherwise, the RR is issued. The SR and RR include zero or more reception report blocks; a block for each of the synchronization sources from which the receiver has received RTP data packets since the last report. It is noted that reports are not issued for contributing sources that are listed in the CSRC list. Each reception report block provides statistics about the data received from the particular source indicated in that block. It is noted that a maximum of 31 reception report blocks may be inserted in an SR or RR packet; thus, RR packets may be stacked after the initial SR or RR packet as needed to contain the reception reports for all sources heard during the interval since the last report.

The sender report packet has a header with a format as shown in FIG. 4. Like the RTP header (in FIG. 3), a 2-bit version field 401 identifies the version of the RTP, and a 1-bit padding (P) field 403 may be set to indicate that the particular RTCP packet contains additional padding octets. A reception report count (RC) field 405 specifies the number of reception report blocks. A packet type (PT) field 407 contains the constant 200 to identify that the packet is an RTCP SR packet. A 16-bit length field 409 is provided. The synchronization source (SSRC) identifier field 411 indicates the originator of the SR packet.

A sender information section (fields 413-419) is 20 octets long and is present in every sender report packet. This section summarizes the data transmissions from the sender. An NTP timestamp field 413 is 64 bits and indicates the time when the report was transmitted. This timestamp field 413 may be used to calculate round-trip propagation. In addition, a RTP timestamp field 415 (32 bits in length) corresponds to the same time as the NTP timestamp field 413, but in the same units and with the same random offset as the RTP timestamps in data packets. The timestamp fields 413 and 415 may be used for synchronization of the sources.

A sender's packet count field 417 is provided to specify the total number of RTP data packets that are transmitted by the sender from the period of the start-up of the transmission through the time the SR packet was generated. The count is reset if the sender changes its SSRC identifier. A sender's octet count field 419 indicates the total number of payload octets (exclusive of the header and padding). This field 419 can be used to estimate the average payload data rate.

Fields 421-435 may contain the reception report blocks. Each reception report block conveys statistics on the reception of RTP packets from a single synchronization source. SSRC identifier fields 421, 435 correspond to the sources associated with the respective reception report blocks. A fraction lost field 423 specifies the fraction of RTP data packets lost from source SSRC since the time the previous SR or RR packet was sent; the fraction is defined as the number of packets lost divided by the number of packets expected. A cumulative number of packets lost field 425 is also supplied, and defined as the number of packets expected less the number of packets actually received. It is noted that packets that arrive late are not counted as lost; the loss may have a negative value if there are duplicates. Also, an extended highest sequence number received field 427. An interarrival jitter field 429 specifies an estimate of the statistical variance of the RTP data packet interarrival time.

A Last SR timestamp (LSR) field 431 specifies the middle 32 bits out of 64 in the NTP timestamp field 413. If no SR has been received yet, the field is set to a default of zero. Information regarding the delay since the last SR (DLSR) is provided in a Delay Since Last SR field 433. The delay may be expressed in units of $1/65536$ seconds between receiving the last SR packet from a source SSRC (in this case, the first source)

and sending this reception report block. If no SR packet has been received yet from the first SSRC, the DLSR field 433 is set to zero.

It is noted that the format of the receiver report (RR) packet is the same as that of the SR packet except that the packet type field contains the constant 201 and the five words of sender information are omitted (these are the NTP and RTP timestamps and sender's packet and octet counts). As explained previously, a profile-specific extensions field 437 is also provided.

The above report is exchanged between a near end station and a far end station to report the quality in the communication session, according to an embodiment of the present invention.

Figure 5:
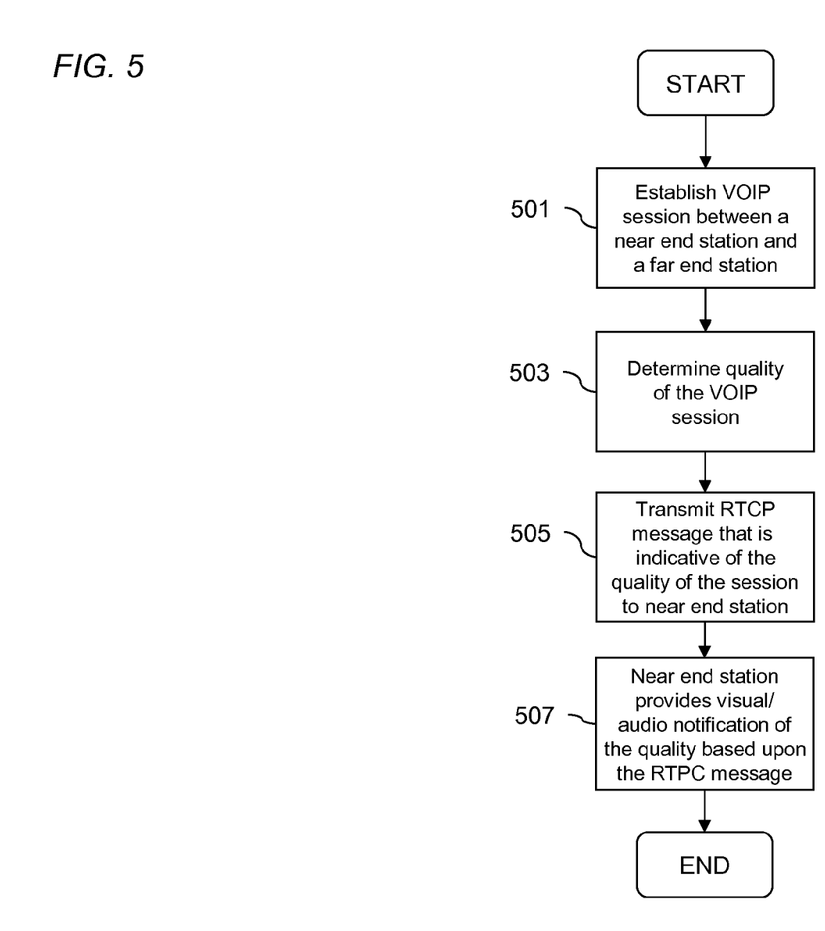
FIG. 5 is a flowchart of a process for providing session quality indication to a near end station, according to an embodiment of the present invention.

FIG. 5 shows a flowchart of a process for providing session quality indication to a near end station, according to an embodiment of the present invention. In step 501, a VOIP session is established between a near end station and a far end station. Next, the quality of the session is determined, per step 503, based upon an RTCP report, as described previously. In step 505, a RTPC message that is indicative of the quality of the session is transmitted to the near end station. The near end station then provides a visual (or audio) notification of the quality of the session based upon the statistics within the RTPC message, per step 507. Exemplary visual notifications are shown in FIGS. 6A and 6B.

Figure 6A:
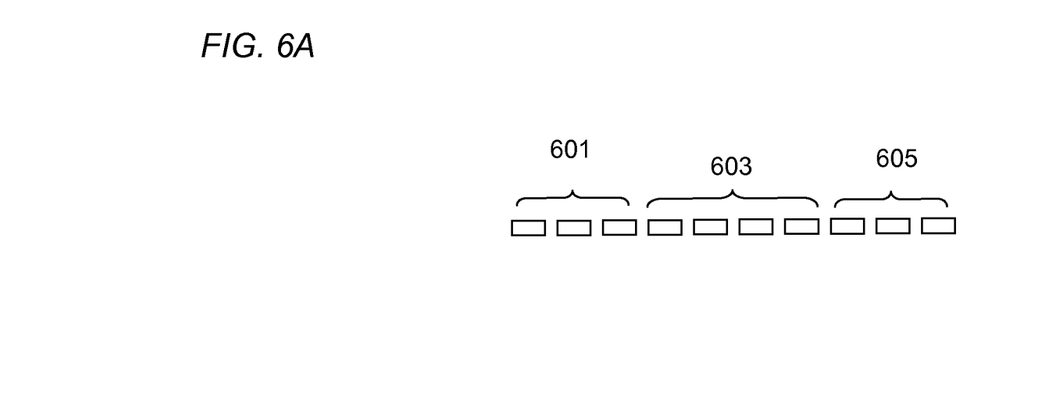
FIGS. 6A and 6B are diagrams of a LED (Light Emitting Diode) type display and a pop-up menu, respectively, to indicate the quality of a communication session, according to an embodiment of the present invention.
Figure 6B:
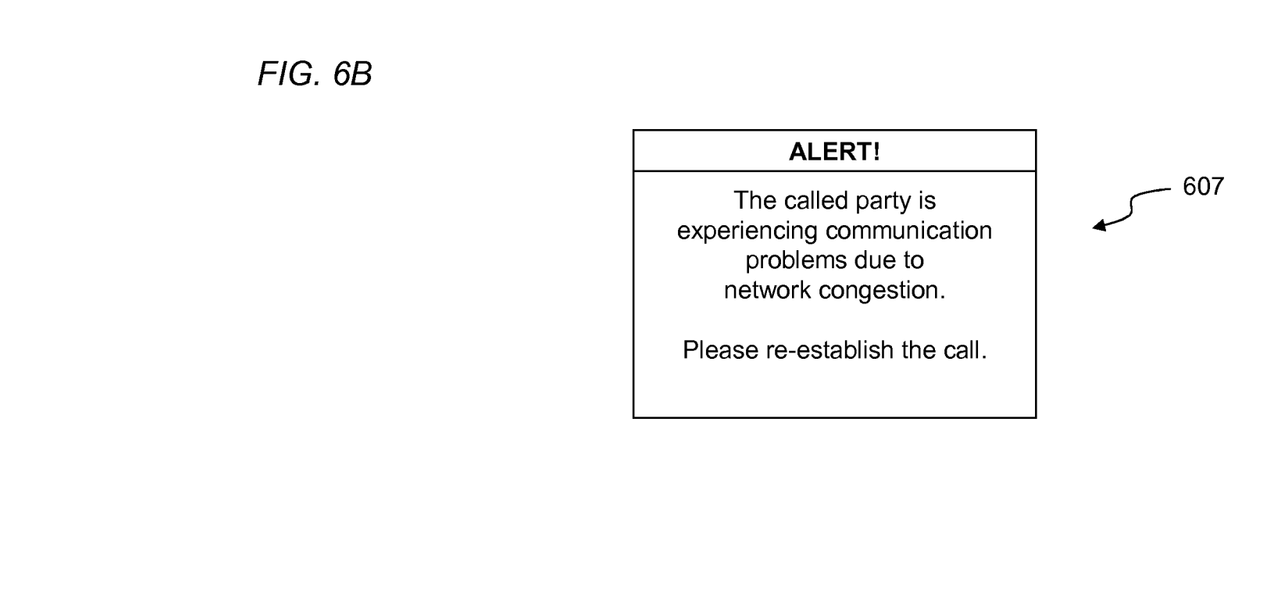

FIGS. 6A and 6B show diagrams of a LED (Light Emitting Diode) type display and a pop-up menu, respectively, to indicate the quality of a communication session, according to an embodiment of the present invention. A LED display, as shown in FIG. 6A, may be implemented in hardware as part of the station (e.g., SIP phone) in which three different LED segments 601, 603, 605 has three colors to represent the degree of the quality of the communication session. For example, the segments 601, 603, 605 may be red, yellow, and green, respectively, whereby the red segment 601 denotes the poorest quality and the green segment 605 the best. Within each of the segments 601, 603, 605, a number of bars may be used to represent sub-levels of the quality. It is recognized that any level of granularity may be utilized to notify the near end station that the communication session is experiencing trouble. Alternatively, the LED display may be represented as part of a graphical user interface (GUI) of the near end station.

FIG. 6B shows another way to notify the near end station of the session quality through the use of a pop-up menu in graphical user interface. A pop-up menu 607, in an exemplary embodiment, is launched upon the quality falling below a predetermined threshold. The menu 607 may described the cause of the problem. Additionally, the menu 607 may instruct the near end station of the appropriate action to take; for example, terminating the session and placing the call again.

Figure 7:
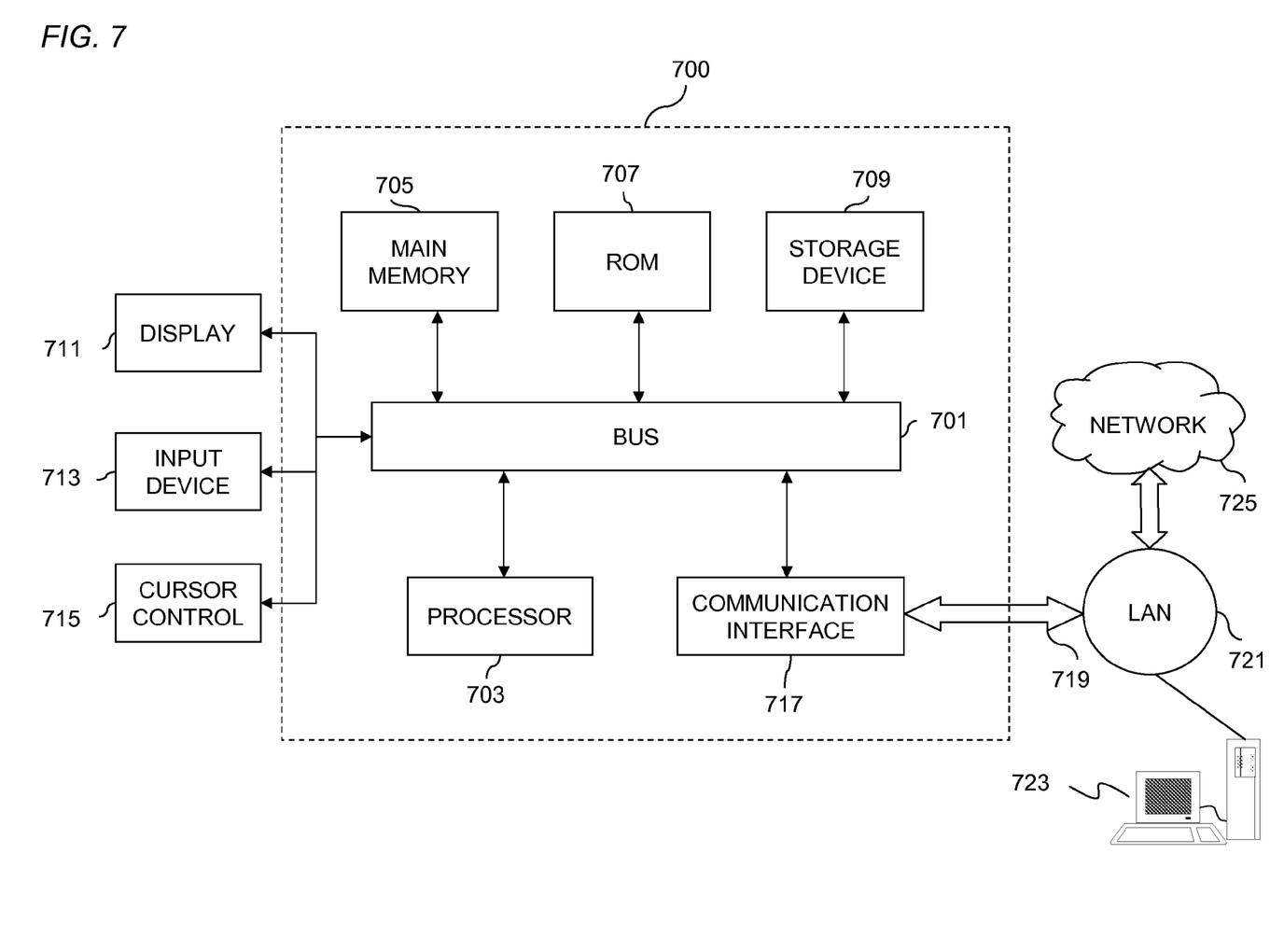
FIG. 7 is a diagram of a computer system that can be used to implement an embodiment of the present invention.

FIG. 7 illustrates a computer system 700 upon which an embodiment according to the present invention can be implemented. The computer system 700 includes a bus 701 or other communication mechanism for communicating information, and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions to be executed by the processor 703. The computer system 700 further includes a read only memory (ROM) 707 or other static storage device coupled to the bus 701 for storing static information and instructions for the processor 703. A storage device 709, such as a magnetic disk or optical disk, is additionally coupled to the bus 701 for storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is cursor control 715, such as a mouse, a trackball, or cursor direction keys for communicating direction information and command selections to the processor 703 and for controlling cursor movement on the display 711.

According to one embodiment of the invention, the processes associated with generation of a quality indicator are provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, or a telephone modem to provide a data communication connection to a corresponding type of telephone line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although only a single communication interface 717 is shown, it is recognized that multiple communication interfaces may be employed to communicate with different networks and devices.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by service provider. The local network 721 and network 725 both use electrical, electromagnetic, or optical signals to convey information and instructions. The signals through the various networks and the signals on network link 719 and through communication interface 717, which communicate digital data with computer system 700, are exemplary forms of carrier waves bearing the information and instructions.

The computer system 700 can send messages and receive data, including program code, through the network(s), network link 719, and communication interface 717. In the Internet example, a server (not shown) might transmit requested code belonging an application program for implementing an embodiment of the present invention through the network 725, local network 721 and communication interface 717. The processor 704 may execute the transmitted code while being received and/or store the code in storage device 79, or other non-volatile storage for later execution. In this manner, computer system 700 may obtain application code in the form of a carrier wave.

The term "computer-readable medium" as used herein refers to any medium that participates in providing instructions to the processor 704 for execution. Such a medium may take many forms, including but not limited to non-volatile media, volatile media, and transmission media. Non-volatile media include, for example, optical or magnetic disks, such as storage device 709. Volatile media include dynamic memory, such as main memory 705. Transmission media include coaxial cables, copper wire and fiber optics, including the wires that comprise bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the present invention provides a feedback mechanism, which may be visual or audio, is introduced to notify a near end station of the quality of a voice communication session over a data network. The feedback mechanism is based upon the quality statistics that are convey via a real-time communications protocol, such as Real-time Transport Control Protocol. The above approach advantageously enhances call processing over the data network.

While the present invention has been described in connection with a number of embodiments and implementations, the present invention is not so limited but covers various obvious modifications and equivalent arrangements, which fall within the purview of the appended claims.

What is claimed is:

1. A method comprising:
generating a plurality of packets for transmission over a first voice path of a voice call with an end station, wherein the first voice path is in a direction to the end station, the voice call having a second voice path in a direction from the end station;
receiving a report packet from the end station indicating quality of the first voice path, wherein the report packet includes a field specifying number of lost packets;
generating a notification for presentation to a user engaged in the voice call, the notification specifying one of a plurality of levels corresponding to the quality of the first voice path based on the report packet; and
selectively initiating termination of the voice call based on the generated notification,
wherein the report packet further includes a field specifying a timestamp corresponding to a time when the report packet was transmitted from the end station, a field specifying a fraction of packets lost from the end station since a previous time a report packet was sent, and a field specifying an estimate of a statistical variance of a packet interarrival time.

2. A method according to claim 1, wherein the voice call is established according to a Real-Time Transport Protocol (RTP) and the report packet is generated according to a Real-Time Transport Control Protocol (RTCP).

3. A method according to claim 1, wherein the notification is either visual, audio, or a combination thereof.

4. A method according to claim 3, wherein the visual notification is represented by either a LED (Light Emitting Diode)-type display, or a pop-up menu.

5. A method according to claim 1, wherein the voice call is established according to a Session Initiation Protocol (SIP).

6. A method according to claim 1, wherein the termination is initiated in response to an input by the user.

7. An apparatus comprising:
a processor configured to generate a plurality of packets for transmission over a first voice path of a voice call with an end station, wherein the first voice path is in a direction to the end station, the voice call having a second voice path in a direction from the end station; and
a communication interface coupled to the processor and configured to receive a report packet from the end station indicating quality of the first voice path, the report packet including a field specifying number of lost packets; and
wherein the processor is further configured to generate a notification for presentation to a user engaged in the voice call, the notification specifying one of a plurality of levels corresponding to the quality of the first voice path based on the report packet, the processor being further configured to selectively initiate termination of the voice call based on the generated notification,
wherein the report packet further includes a field specifying a timestamp corresponding to a time when the report packet was transmitted from the end station, a field specifying a fraction of packets lost from the end station since a previous time a report packet was sent, and a field specifying an estimate of a statistical variance of a packet interarrival time.

8. An apparatus according to claim 7, wherein the voice call is established according to a Real-Time Transport Protocol (RTP) and the report packet is generated according to a Real-Time Transport Control Protocol (RTCP).

9. An apparatus according to claim 7, wherein the notification is either visual, audio, or a combination thereof.

10. An apparatus according to claim 9, wherein the visual notification is represented by either a LED (Light Emitting Diode)-type display, or a pop-up menu.

11. An apparatus according to claim 7, wherein the voice call is established according to a Session Initiation Protocol (SIP).

12. An apparatus according to claim 7, further comprising:
a user interface configured to receive an input by the user, wherein the termination is initiated in response to the input by the user.

13. A method comprising:
receiving a plurality of packets over a first voice path of a voice call with an end station, wherein the first voice path is in a direction from the end station, the voice call having a second voice path in a direction to the end station;
generating a report packet indicating quality of the first voice path, wherein the report packet includes a field specifying number of lost packets;
initiating transmission of the report packet to the end station; and
selectively receiving a request from the end station to terminate the voice call based on the transmitted report packet,
wherein the report packet further includes a field specifying a timestamp corresponding to a time when the report packet was transmitted to the end station, a field specifying a fraction of packets lost since a previous time a report packet was sent, and a field specifying an estimate of a statistical variance of a packet interarrival time.

14. A method according to claim 13, wherein the voice call is established according to a Real-Time Transport Protocol (RTP) and the report packet is generated according to a Real-Time Transport Control Protocol (RTCP).

15. An apparatus comprising:
a communication interface configured to receive a plurality of packets over a first voice path of a voice call with an end station, wherein the first voice path is in a direction from the end station, the voice call having a second voice path in a direction to the end station; and
a processor coupled to the communication interface and configured to generate a report packet indicating quality of the first voice path, the report packet including a field specifying number of lost packets, the processor being further configured to initiate transmission of the report packet to the end station,
wherein the communication interface is further configured to selectively receive a request from the end station to terminate the voice call based on the transmitted report packet, and
wherein the report packet further includes a field specifying a timestamp corresponding to a time when the report packet was transmitted to the end station, a field specifying a fraction of packets lost since a previous time a report packet was sent, and a field specifying an estimate of a statistical variance of a packet interarrival time.

16. An apparatus according to claim 15, wherein the voice call is established according to a Real-Time Transport Protocol (RTP) and the report packet is generated according to a Real-Time Transport Control Protocol (RTCP).

* * * * *